United States Patent [19]
Kimber et al.

[11] Patent Number: 5,638,497
[45] Date of Patent: Jun. 10, 1997

[54] VIRTUAL PRINTER

[75] Inventors: Charles M. Kimber, Palmdale; Allen E. Russ, Thousand Oaks; Michael L. Steen, Newbury Park, all of Calif.

[73] Assignee: Dataproducts Corporation, Simi Valley, Calif.

[21] Appl. No.: 270,153

[22] Filed: Jul. 1, 1994

Related U.S. Application Data

[63] Continuation-in-part of Ser. No. 216,600, Mar. 23, 1994, Pat. No. 5,371,837, which is a continuation of Ser. No. 993,057, Dec. 18, 1992.

[51] Int. Cl.$^6$ .................................................. G06K 15/00
[52] U.S. Cl. ............................................. 395/114; 395/112
[58] Field of Search .............................. 395/114, 112, 395/115, 116, 200.1, 200.16, 200.01, 828, 829, 834; 358/452, 444, 467

[56] References Cited

U.S. PATENT DOCUMENTS

| | | | |
|---|---|---|---|
| 5,047,957 | 9/1991 | Ikenoue | 395/112 |
| 5,050,098 | 9/1991 | Brown, III et al. | 364/519 |
| 5,075,874 | 12/1991 | Steeves et al. | 395/112 |
| 5,077,655 | 12/1991 | Jinzaki | 395/200 |
| 5,293,466 | 3/1994 | Bringmann | 395/114 |
| 5,303,336 | 4/1994 | Kageyamaa et al. | 395/114 |

OTHER PUBLICATIONS

*LaserTools Printer Control Panel*, User Manual, Version 2.2 1991.
*VPT Network Architecture*, "An Intelligent Approach to Network Printing," 1993 Dataproducts Corporation.
Scott Friedman, "Virtual Printers Bow," *Open Systems Today*, 127 Jul. 5, 1993.
Fredric Paul, "Dataproducts preps Virtual Printer Technology wares," *Network World*, vol. 10, No. 23, Jun. 7, 1993.
Kelley Damore, "VPT turns printers into configurable systems and Dataproducts readies two VPT printers," *Info World*, Jun. 14, 1993.
Stephanie LaPolla, "Software eases neet printing," *PCWeek*, vol. 10, No. 23, Jun. 14, 1993, p. 17.
Mathew Rothenberg, "New Dataproducts technology due for LaserWriters," *MacWeek*, vol. 7, No. 24, Jun. 14, 1993.
Dan Muse, "VPT Offers Many Printers from One," *BYTE*, Aug. 1993.
Margie Semilof, "New Dataproducts Printers Support Multiple Printing Configurations," *Communications Week*, No. 459, Jun. 21, 1993.
"Dataproducts releases enterprise VPT printers," *Computer Reseller News*, Jul. 14, 1993.
"Dataproducts Takes Networking a Step Farther with VPT," *Observer*, vol. III, No. 7, Jul. 1993 pp. 1, 40–44.
"Dataproducts debuts 'virtual printer' technology," *The Latest Word*, vol. 7, No. 11, pp. 23–24 Jul. 5, 1993.
Paula Birsley, "Dataproducts Announces New Virtual Printer Technology," *Dataquest Alert*, Jun. 21, 1993 pp. 1–3.
Fredrick Paul, *Network World*, "Dataproducts' VPT Lets Single Printers Support Multiple Net Protocols," HEADSUP—Your Story Request, Jun. 7, 1993.
Mike Hurwicz, "Virtual Printer Technology turns a network printer . . . ," *LAN Times*, Aug. 9, 1993.
K30 and K30D Printer Product Specifications, O Level 0.2, dated May 8, 1991.
Pacer Software, PacerLink PacerPrint PacerShare, Host System Installation and Administration, dated 1990.

*Primary Examiner*—Arthur G. Evans
*Attorney, Agent, or Firm*—Loeb & Loeb LLP

[57] ABSTRACT

A work station user selects a desired printer default configuration. Thereupon an address exclusively associated with the selected default configuration is appended to the print data sent from the work station to the printer. Default configuration setting circuitry provided, e.g., in a circuit card installed in the printer receives the address and, via a look-up table, provides instructions for implementing the default configuration associated with the address. The printer is then configured in accordance with the selected default configuration.

8 Claims, 6 Drawing Sheets

VIRTUAL PRINTER

RELATED APPLICATION INFORMATION

This is a continuation-in-part of U.S. patent application Ser. No. 08/216,600, filed Mar. 23, 1994, U.S. Pat. No. 5,371,857, which is a continuation of abandoned U.S. patent application Ser. No. 07/993,057, filed Dec. 18, 1992.

BACKGROUND OF THE INVENTION

1. Field of the Invention

The present invention relates to apparatus and methods for controlling the configuration of a printer and, in particular embodiments, for allowing a user to select a printer default configuration from a plurality of preset default configurations to control a printer connected in a multiple work station network.

2. Description of Related Art

In a typical computer printer, it is necessary to establish a default configuration. Typically, the printer has a default configuration set by the user or preset by the manufacturer. Default configurations comprise sets of instructions for controlling certain parameters of the printing operations performed by the printer, including, but not limited to, fonts, paper sizes, page description languages, finishing options and stackers. Data or instructions for setting the default configuration are typically stored in a memory circuit within the printer.

In a typical network system, e.g., wherein one or more printers are connected, through a network communications link, to a plurality of individual work stations (e.g., personal computer terminals), each printer will have a preset default configuration, as discussed above. Each work station accessing a printer must operate with the default configuration set for that printer. It is often the case in a multiple work station network that the user of one work station will require a printer default configuration different than the printer default configuration required by the user of another work station.

If more than one printer is connected in the network, each printer may have a default configuration different from the default configuration set for the other printers in the network. Any one printer may be selectively accessed by a work station user by selecting that printer's network port. In this regard, by connecting a plurality of printers in the network through a corresponding plurality of network ports, a work station user may select the printer (and, thus, the default configuration set for that printer) to accommodate that user's printing needs.

However, the cost of including multiple printers in a network can be relatively high, especially where a large number of printers (and default configurations) are required. Moreover, the physical capabilities of the work stations or the network communications link may limit the number of printer network ports (and, thus, the number of printers having different default configurations) operable in the network. Thus, there is a need in the industry for an economical system which allows work stations in a network to operate with multiple printer default configurations, e.g., by allowing the work station users to select any one of the multiple printer default configurations.

SUMMARY OF THE DISCLOSURE

In a network, a device typically has a unique communications protocol address for each protocol compatible therewith. In embodiments of the present invention, the print server responds to multiple protocol addresses. Each address to which the print server responds is uniquely associated with a default configuration.

In accordance with one embodiment of the invention, a printer is selectively controlled to operate as any one of a plurality of "VIRTUAL PRINTERs." ("VIRTUAL PRINTER" is a Trademark of the assignee, Dataproducts Corporation.) Each "VIRTUAL PRINTER" has a default configuration which differs from the default configuration of the other "VIRTUAL PRINTERs." In this regard, a single printer connected in a network through a single printer network interface can be operated in accordance with any one of the plural default configurations.

A work station user selects a desired printer default configuration by selecting a unique communications protocol address associated with that default configuration. By directing the print data to the selected communications protocol address, the printer automatically assumes the default configuration associated with that address. Default configuration setting circuitry provided, e.g., in a circuit card installed in the printer, is programmed to respond to the communications protocol address and, via a look-up table, provide instructions for implementing the default configuration associated with the address. The printer is then configured in accordance with the selected default configuration.

If the same work station user or another work station user desires a different printer default configuration, the new default configuration is selected by that user and print data sent from that work station is directed to the communications protocol address associated with the new default configuration. The default configuration setting circuitry provides instructions for implementing the default configuration associated with the communications protocol address in the manner discussed above, such that the printer is then configured in accordance with the new default configuration.

In this regard, print data for a plurality of printer default configurations can be sent through a single printer network interface to a single printer. The printer can be configured in accordance with any one of the plural default configurations, thus obviating the need to connect a plurality of printers (each having a different default configuration) through a plurality of printer ports in the network. As a result, considerable cost in providing a separate printer for each default configuration can be avoided. In addition, with the reduction in individual printers connected in the network, the number of printer ports needed in the network may be reduced.

Each printer default configuration will appear to the user as a separate printer, i.e. a "VIRTUAL PRINTER" having its own unique set of operating parameters differing from those of other VIRTUAL PRINTERs. As discussed above, such operating parameters may include, but are not limited to, font, paper size, page description language, finishing option and stacker parameters. In addition, each VIRTUAL PRINTER may have an "interruptable" (or "noninterruptable") parameter which allows a print job to be interrupted (or to prohibit interruption) by another print job directed to another VIRTUAL PRINTER address.

Further embodiments provide status information to the user regarding the VIRTUAL PRINTER accessed by the user or regarding the physical condition of the printer itself. Yet further embodiments provide selective access (or authorized access) features, wherein one or more VIRTUAL PRINTERs is accessible by only authorized users. Additional embodiments employ VIRTUAL PRINTER parameters for further operations, such as facsimile, scanner, external memory of other suitable operations and functions.

Further embodiments employ a "print pending" feature, wherein a user may direct a print job to a selected VIRTUAL PRINTER address, but delay printing until an additional code is entered either manually at the printer or from the user's work station or other network location. Other objects, benefits and features of the present invention will be apparent from the following description.

BRIEF DESCRIPTION OF THE DRAWINGS

The detailed description will be made with reference to the accompanying drawings, wherein like numerals designate corresponding parts in the several figures.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

As discussed above, in one embodiment of the invention, a printer is selectively controlled to operate as any one of a plurality of "VIRTUAL PRINTERs." Each VIRTUAL PRINTER has a default configuration which differs from the default configuration of the other VIRTUAL PRINTERs. In this regard, a single printer connected in a network through a single printer network interface can be operated in accordance with any one of the plural default configurations.

Figure 1:
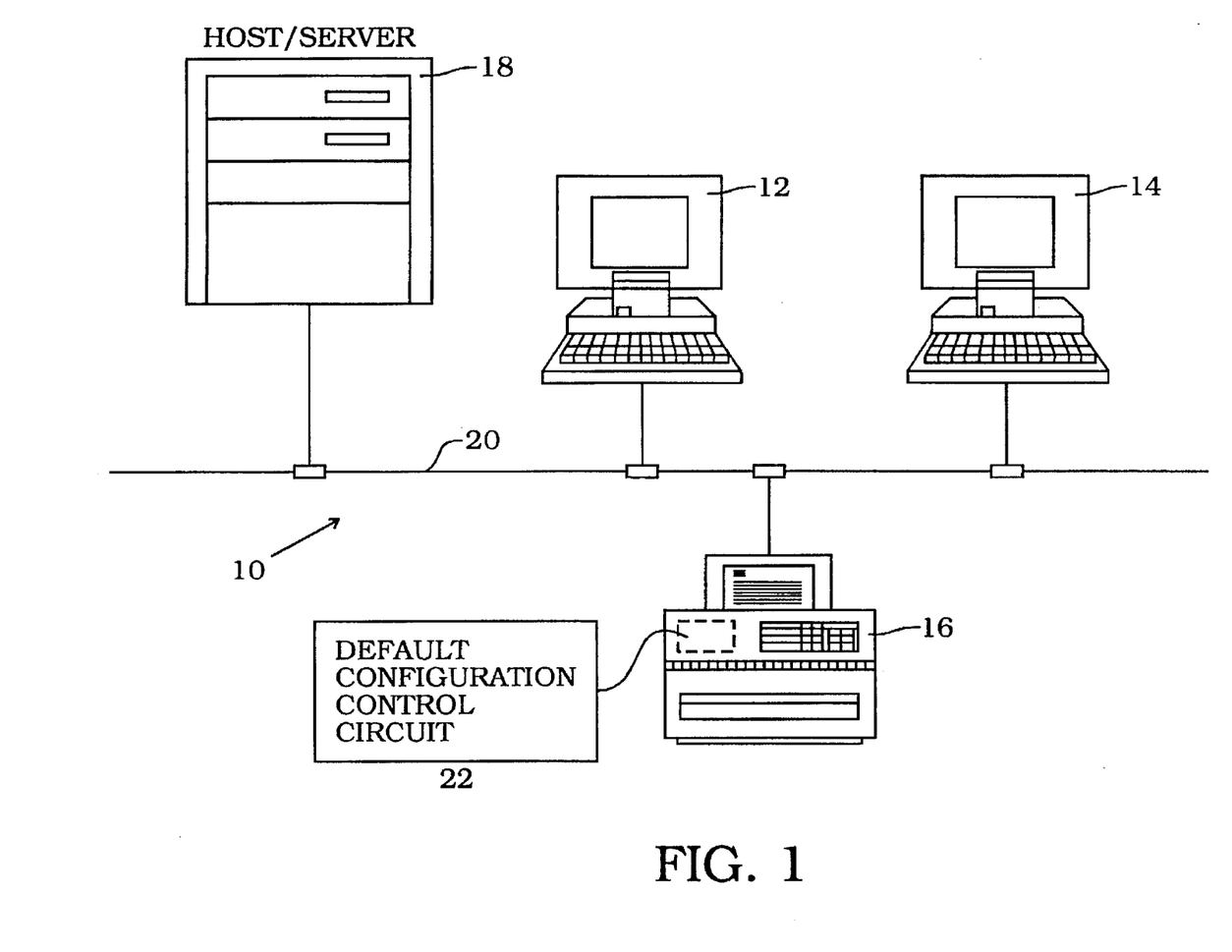
FIG. 1 is a block diagram of a computer network employing an embodiment of the present invention.

FIG. 1 is a block diagram of a computer network 10 in which a number of individual work stations are connected, through a network communications link, to a printer station. The individual work stations, shown at reference numbers 12 and 14, may be, for example, personal computer terminals (PCs). The printer station may comprise, for example, an ink jet printer (with a default configuration control circuit as discussed below) as shown at reference character 16. FIG. 1 also shows a host/server station 18 connected in the network. A network communications link 20 interconnects the above discussed stations 12-18.

The default configuration, with which the printer 16 operates for any given printing job, is controlled by a default configuration control circuit 22. In the illustrated embodiment, the circuit 22 is provided in a circuit card mounted inside of the printer housing. However, it will be understood that, in other embodiments, the circuit 22 may be provided external to the printer housing or otherwise suitably connected between the print engine and the printer network interface.

In response to print job signals sent from a work station 12 or 14 or from a host server, the circuit 22 selects a set of default configuration instructions from a plurality of sets of such instructions. The selected set of instructions are provided to the general default control circuitry of the printer to set the printer's default configuration. The selection of the particular set of default configuration instructions is controlled by the user's selection of the communications protocol address associated with the default configuration.

The printer 16, with the control circuit 22, has multiple default configurations, each designated as a "VIRTUAL PRINTER". Circuit 22 could be implemented in hardware and/or software. Each VIRTUAL PRINTER is associated with a unique communications protocol address. When accessing the printer, the user of the accessing work station, e.g., work station 12, directs the print job to the communications protocol address of the VIRTUAL PRINTER with the default configuration desired by the user.

As discussed below, upon receiving the print job from work station 12, the circuit 22 recognizes the communications protocol address as being associated with one of the VIRTUAL PRINTERs. The circuit 22 then provides the printer 16 with printer default configuration instructions for the VIRTUAL PRINTER associated with the communications protocol address. In response to the instructions from circuit 22, the printer 16 is automatically set to the default configuration specified for the VIRTUAL PRINTER associated with the communications protocol address selected at the work station 12, without manual action on the operator control panel of the printer. With the printer 16 set in accordance with the selected default configuration, the print job from the work station 12 is processed by the printer.

The circuit 22 includes an address processing circuit and a look-up table and associated memory for storing a plurality of default configuration instruction sets with a corresponding plurality of communications protocol addresses. The circuit 22 receives a print data signal from the work station 12 directed to the selected communications protocol address. The circuit 22 processes the communications protocol address and provides the default configuration instruction set corresponding to the communications protocol address in the look-up table, for setting the printer 16 with a particular default configuration (or VIRTUAL PRINTER). Thus, the work station user can set the physical printer 16 to any one of the plurality of default configurations (VIRTUAL PRINTERs) by selecting the associated communications protocol address and sending the print job signals to that address.

Figure 2:
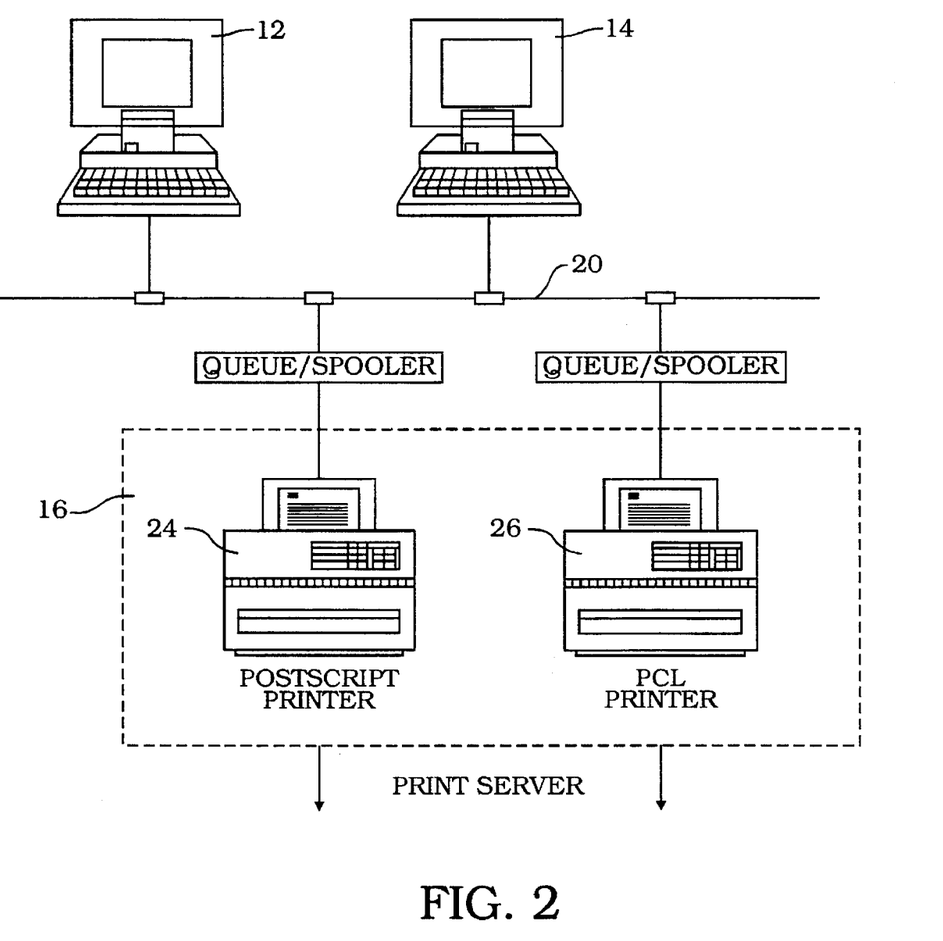
FIG. 2 is a block diagram representing the computer network of FIG. 1, as perceived by a work station user.

In this manner, the physical printer 16 appears to the work station user as a plurality of VIRTUAL PRINTERs, each of which are uniquely addressable. FIG. 2 is a block diagram representing this user perceived arrangement with two VIRTUAL PRINTERs 24 and 26. FIG. 2 also shows a "Queue/Spooler" for each VIRTUAL PRINTER, as perceived by the work station user. The "Queue/Spooler" function may actually be performed by the Host/Server 18 (FIG. 1) or the work station itself.

Figure 3:
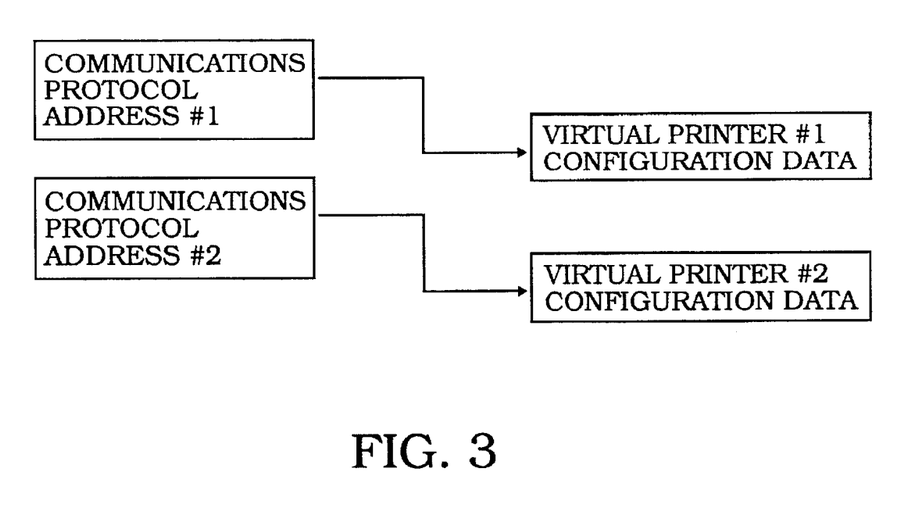
FIG. 3 is a block diagram representing a look-up table of a printer default configuration control circuit indexed by the communications protocol address in accordance with an embodiment of the present invention.

FIG. 3 is a block diagram representing the look-up table for the circuit 22. Each box on the right side of FIG. 3 corresponds to an addressable location of a memory circuit wherein the printer default configuration instructions for a particular VIRTUAL PRINTER are stored. The communications protocol address provided from the work station is converted into a table index and the VIRTUAL PRINTER configuration instructions corresponding to the table index are provided to configure the physical printer 16 for the print job provided by the work station. The memory circuit may be provided as part of the printer's general memory circuit or may be provided as an additional circuit internal or external to the printer housing.

Figure 4:
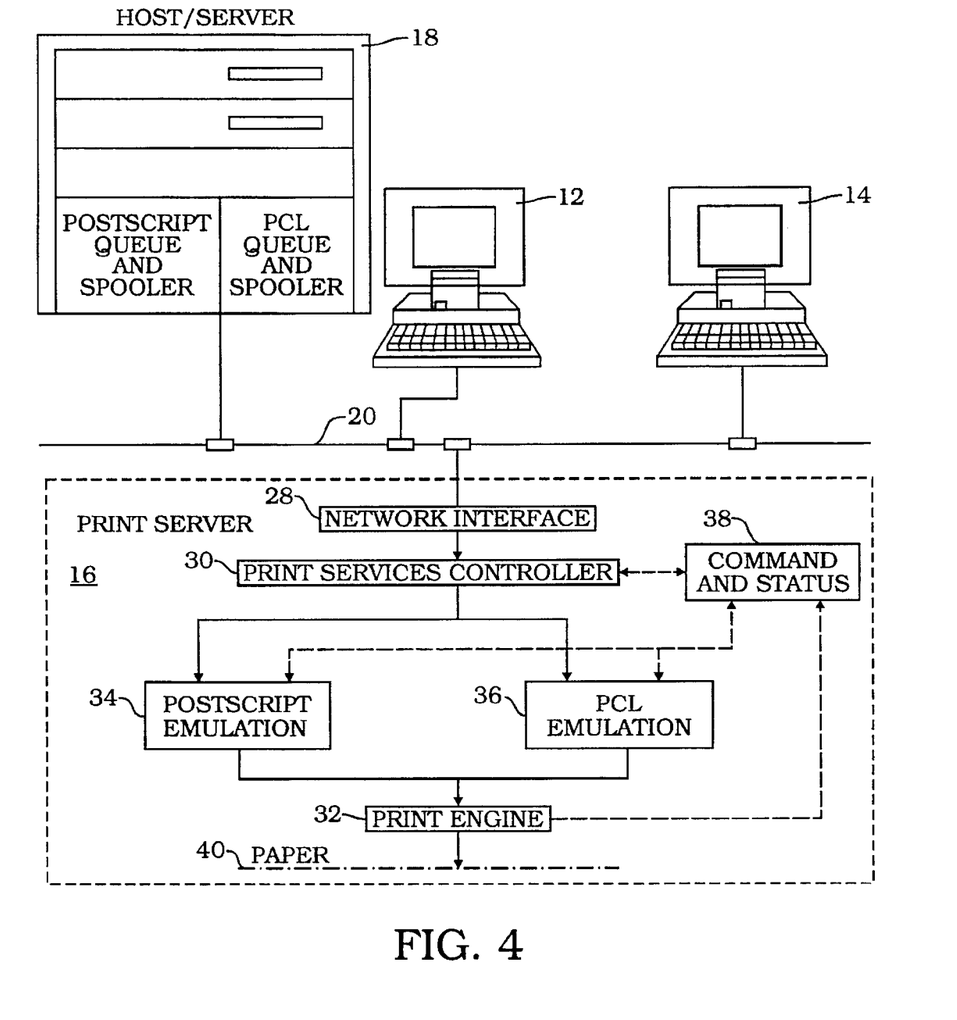
FIG. 4 is a block diagram of the network shown in FIG. 1, with a further representation of internal architecture of the printer shown in FIG. 1.

FIG. 4 is a block diagram of the network shown in FIG. 1, with a further representation of internal architecture of the printer 16 and the printer network interface. The printer network interface 28 connects the 10 rest of the printer with the network communications link 20. A print services controller 30 provides the general processing functions for operating the print engine 32, including monitoring the system for status and for faults, such as the occurrence of low toner or a paper jam. In this embodiment, the processor and look-up table for the printer default configuration control circuit 22 is included in the controller 30. Thus, the printer default configuration control circuit 22 may be provided within the printer's general control circuitry. Alternatively it may be provided, as discussed above, in a circuit card added to the printer's ordinary control circuitry or as an external circuit, external to the printer housing and located after the printer network interface.

FIG. 4 also shows further printer components, including PostScript Emulation and PCL Emulation circuits 34 and 36 and a Command and Status circuit 38. The emulation circuits 34 and 36 function, generally to interpret print job data and provide print engine control signals to the print engine 32. Emulation circuit 34 operates for POSTSCRIPT (trademark) and ADOBE (trademark) type printers and emulation circuit 36 operates for HEWLETT PACKARD (trademark) type printers. Further embodiments may have emulation circuits for other types of printers.

The Command and Status circuit 38 receives signals from the print services controller 30, the emulation circuits 34 and 36 and the print engine 32 and provides control signals to the print services controller and the emulation circuits, e.g., for the fault monitoring functions, etc. The print engine 32 may be, for example a 30 PPM (page-per-minute) print engine. Print engine control signals from the emulators 34 and 36 control the print engine 32 to print on a print medium, such as paper 40.

In operation, a work station user selects a first printer default configuration for a first print job. Thereupon the data for the first print job is sent to the first communications protocol address exclusively associated with the selected default configuration. The work station may be controlled, e.g., by software which provides user prompting indicia on the work station terminal for instructing a user to make a default configuration selection via the work station keyboard. Alternatively, the work station may be programmed to automatically select a particular default configuration.

Default configuration setting circuitry 22 provided, e.g., in the printer, responds to the first communications protocol address and, via a look-up table, provides instructions for implementing the default configuration associated with the first communications protocol address. The printer is then configured as a first VIRTUAL PRINTER, in accordance with the selected default configuration.

If a second work station user, or the same work station user, selects a second default configuration for second print job, the print data for the second print job is sent to a second communications protocol address (associated with the second default configuration). The default configuration setting circuitry 22 responds to the second communications protocol address and, via the look-up table, provides instructions for implementing the default configuration associated with the second communications protocol address. The printer is then configured as a second VIRTUAL PRINTER, in accordance with the second default configuration.

By sending print data for a further print job to the first communications protocol address, the printer default configuration of the first VIRTUAL PRINTER will be restored for the further print job. In addition to the default configuration for each VIRTUAL PRINTER, the context (or active configuration) of each VIRTUAL PRINTER is optionally preserved (e.g., via a memory circuit as discussed above) and may be restored between print jobs. Thus, if, for example, the user of the first work station was using, as an active configuration, a form blank and had printed a completed form using the first VIRTUAL PRINTER, upon restoring the first VIRTUAL PRINTER, the user would also restore the form blank. This can be extremely efficient and cost saving in networks wherein a particular context is used over and over by the same or different work station users.

Consider, for example, a computer network in an accounting firm, wherein several accountants are connected, via their individual work stations to a computer network. An accountant may wish to fill out a first form blank (e.g., a tax form 1040A) for one client and a second form blank (e.g., a balance sheet form) for another client. Assuming that the first and second blank forms are implemented by software, e.g., via a template in a word processing software (e.g., WORDPERFECT, a trademark), the accountant first selects the template for the first form blank, fills in the blanks with appropriate information and sends the data as a print job to the first VIRTUAL PRINTER.

The accountant then selects the template for the second form blank, fills in the blanks with appropriate information and sends the data as a print job to the second VIRTUAL PRINTER. If, at a later time, the accountant wishes to fill out the first form blank for yet another client, the accountant may access the first VIRTUAL PRINTER and thereby not only restore the default configuration associated with the first VIRTUAL PRINTER, but also restore the context of the print job previously sent to the first VIRTUAL PRINTER, i.e., the form blank for the first form. Additionally, if a second accountant in the network wishes to fill out the second form blank for yet another client, the second accountant may access the second VIRTUAL PRINTER and thereby restore the default configuration associated with the second VIRTUAL PRINTER and the second form blank.

While the above example relates to a network in an accounting office, wherein various "contexts" comprise accounting forms, it will be understood that further embodiments of the invention may be configured for other types of office, lab, academic or other applications. Other types of "contexts" may be law forms, letter heads, blank graphs or tables, architectural, engineering or artistic drawings, or the like.

In further embodiments, context management schemes, such as context saving features and/or priority features, are provided. For example, as noted above, the context employed for one print job may be restored for additional print jobs. However, the ability to shift from one print job to another (and from one context to another) need not occur between print jobs, but may occur as an interruption of an on-going print job. For example, each VIRTUAL PRINTER (or, alternatively, each print job) may be provided with a parameter for indicating whether or not the printing operation may be interrupted by the presence of an additional print job. Thus, a print job being printed with a VIRTUAL PRINTER configuration (or context) having an "interruptable" code may be interrupted before the end of the print job for the printing of another print job, e.g., directed from an additional user to the same or different VIRTUAL PRINTER (or context). In this manner, large print jobs may be interrupted so that shorter print jobs can be printed. Likewise, lower priority print jobs may be interrupted so that higher priority print jobs may be printed. Preferably, the interruption control interrupts the first print job on a page boundary.

For example, a first print job may be directed to the address associated with a first VIRTUAL PRINTER with a first context. A second print job directed to a second VIRTUAL PRINTER (or the same VIRTUAL PRINTER) may be sent to the printer during the printing operation of the first print job. If the first print job is interruptable (i.e., the first VIRTUAL PRINTER includes an "interruptable" parameter) the first VIRTUAL PRINTER will temporarily halt the printing of the first print job (e.g., at a suitable location, such as between pages). The printer will then be configured in accordance with the second VIRTUAL PRINTER and will print the second print job. Upon completion of the second print job, the printer will be restored with the first VIRTUAL PRINTER configuration (and the first context) and will proceed with the printing operation of the first print job. Thus, one print job may be interrupted for the processing and printing of a second print job and, upon completion of the second print job, the printer may be reconfigured for completing the processing of the first print job.

Figure 5A:
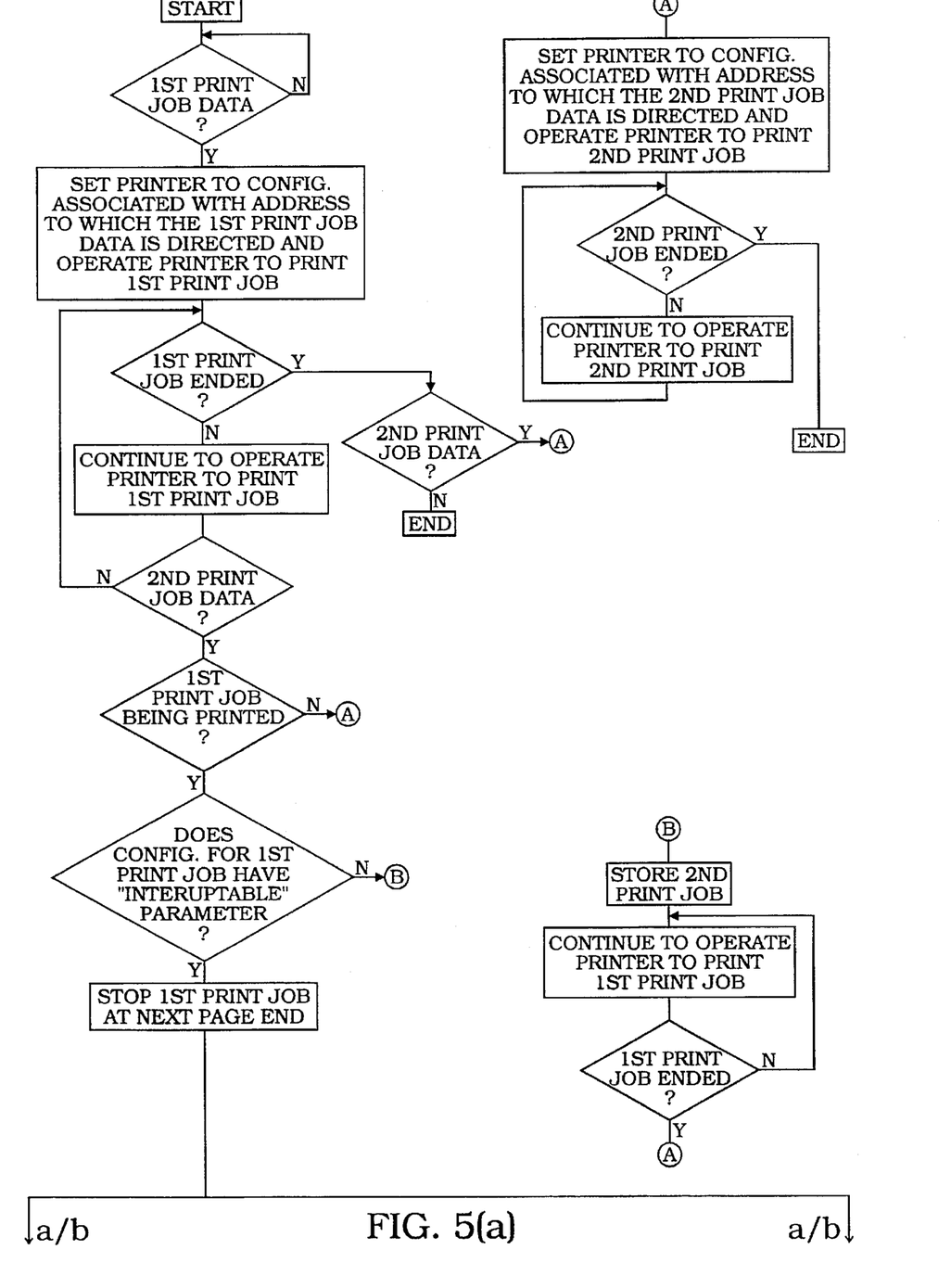
FIG. 5 is a flow chart showing an embodiment of an interruption feature.
Figure 5B:
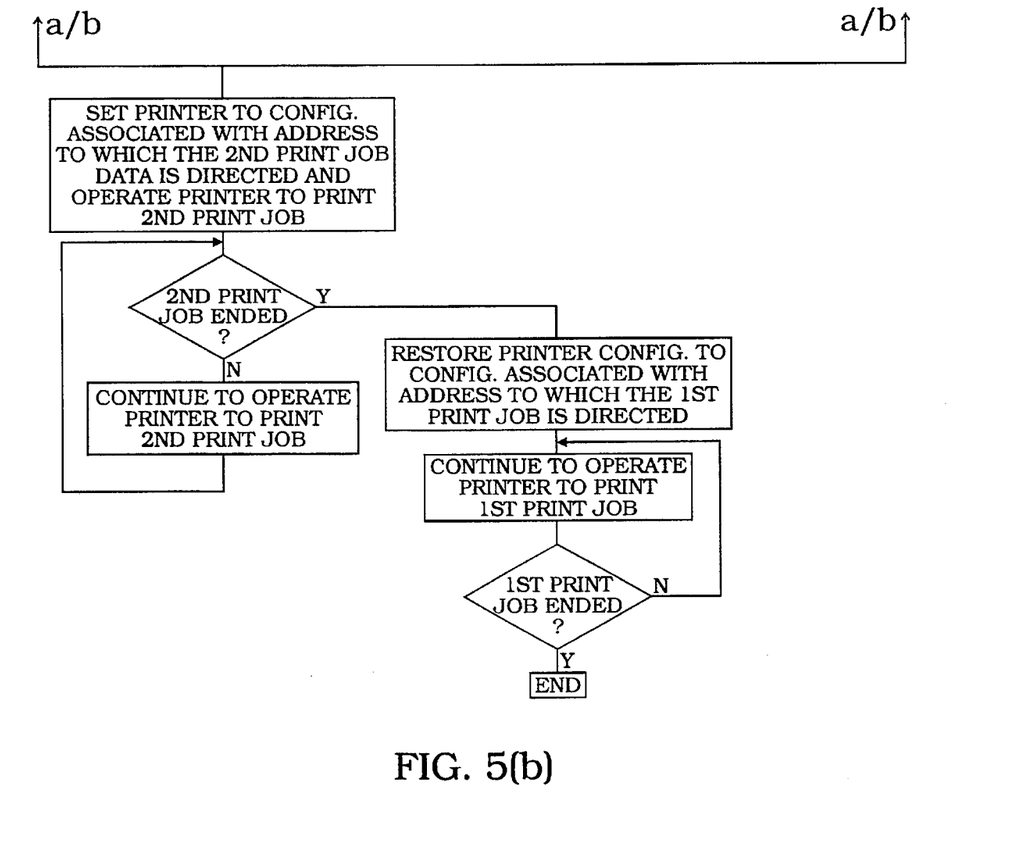

In preferred embodiments, each VIRTUAL PRINTER includes either an "interruptable" parameter or a "non-interruptable" parameter. A print job directed to a VIRTUAL PRINTER having an "interruptable" parameter may be interrupted during its printing operation, whereas a print job directed to a VIRTUAL PRINTER having a "non-interruptable" parameter would not be interrupted by the presence of an additional print job. Instead, the additional print job may be stored until the printer has completed the first print job. In this manner, the interruption control is provided by the operation parameters associated with the VIRTUAL PRINTERs and not be commands sent from the user. Thus, one or more VIRTUAL PRINTERs will be preset as "interruptable" or "non-interruptable." FIG. 5 shows a flow chart of an interruption control scheme according to an embodiment of the invention. In preferred embodiments, the controller of the print server has the capability to perform the yes or no determinations shown in the flow chart of FIG. 5. This capability may be implemented through hardware, software or a combination thereof.

In additional embodiments, each VIRTUAL PRINTER may have a parameter for "interrupting" or "non-interrupting" other print jobs. In such embodiments, the "interrupting" or "non-interrupting" parameter of the second print job received by the printer will determine whether or not the first print job being printed by the printer is to be interrupted or not. As an alternative or in addition to the "interruptable," "non-interruptable," "interrupting" or "non-interrupting" parameters, VIRTUAL PRINTERs may be provided with priority codes wherein one VIRTUAL PRINTER may take priority over another. In this manner, a print job directed to an address associated with a higher priority VIRTUAL PRINTER may interrupt a print job which was directed to the address associated with a lower priority VIRTUAL PRINTER. In preferred embodiments of this alternative design, the controller of the print server has the capability to determine the relative priorities of the various VIRTUAL PRINTERs and to control the interruption and printing functions of the printer. This capability may be implemented through hardware, software or a combination of both.

According to embodiments of the invention, multiple simultaneous communications protocols (e.g., LAT, TCP/IP, ETHERTALK (all believed to be trademarks), or the like) may be used and the VIRTUAL PRINTERs will be uniquely addressed in each available protocol. Priorities may be provided, e.g., by the end user, for governing the order in which multiple simultaneous print requests would be processed by the printer.

In further embodiments, the printer would automatically track resources used by each VIRTUAL PRINTER. Such resources may include, but are not limited to, images printed, physical sheets printed and bytes processed. In response to a command issued by an end user, the printer will provide a report and/or reset the resource statistics for all or a selected number of VIRTUAL PRINTERs. In preferred embodiments, a portion of the memory associated with the look-up table is devoted to this tracking and reporting feature.

In preferred embodiments, the status of the printer or of various VIRTUAL PRINTERs may be accessed by a user. For example, the printer controller can report various operation or resource information to a user, such as the identity of the print job presently being printed, toner status, paper supply status, paper tray status (e.g., which paper tray is coupled to the printer), or other information regarding the printer. A user accessing a particular VIRTUAL PRINTER may be provided with status information regarding that VIRTUAL PRINTER, such as the number of pages printed by that VIRTUAL PRINTER, configuration information regarding that VIRTUAL PRINTER, the availability of that VIRTUAL PRINTER, or whether or not the print configuration of the VIRTUAL PRINTER requires different paper or paper trays to be installed in the printer. Other information may be reported to the user, such as authorization parameters, default parameters and network parameters.

In further preferred embodiments, one or more VIRTUAL PRINTERs may be provided with selective access (or authorized access) features, such that only authorized users may access the VIRTUAL PRINTER. Thus, an authorized user may be provided with the capability to direct print job data to the address or addresses associated with specific VIRTUAL PRINTERs, while unauthorized users are not provided with such capabilities.

In yet further embodiments, the printer may include non-printing capabilities, such as, facsimile transmission capabilities, scanner capabilities, or other suitable capabilities. With such printers, one VIRTUAL PRINTER includes the configuration necessary for transmitting a facsimile. Another VIRTUAL PRINTER may include configurations necessary for scanning a document. Thus, a print job directed to the address associated with a facsimile transmission VIRTUAL PRINTER could be transmitted from the printer to a facsimile receiving device. Similarly, the facsimile VIRTUAL PRINTER could receive a facsimile transmission from an external device or incorporate facsimile data into additional data or context within a user's print job.

Further embodiments may employ a "print pending" feature which allows the printer to receive a print job and hold the print job until a further predefined code or signal is received by the printer. For example, a user may direct a print job to a particular VIRTUAL PRINTER address, wherein the VIRTUAL PRINTER includes a print pending parameter. The print job data is stored at the printer until an additional signal or code is received by the printer. This additional signal or code may be, for example, a personal identification number entered on the printer control panel itself or, alternatively, from the user station or other network location. This feature is helpful for situations wherein it is desirable to have the user present at the printer at the time that the print job is being printed. For example, a user may want to be present at the printer to load a particular type of paper into the printer before the print job is actually printed. This feature is also beneficial for printing confidential documents, wherein the user would want to be present at the printer as the document is being printed to ensure that the document isn't retrieved or seen by unauthorized persons.

Various combinations of the above features may be employed together.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A method of setting a printer default configuration for a printer coupled to a communications network link capable of carrying data for multiple print jobs directed to multiple respective network addresses, the method comprising the steps of:

associating a first network address with a first printer default configuration and a second network address with a second printer default configuration;

providing first print job data for a first print job;

directing the first print job data over the communications network link to a first network address associated with a first printer default configuration;

setting a printer in accordance with the default configuration associated with the first network address, in response to the direction of first print job data to the first address;

operating the printer in accordance with the first print job data and the default configuration associated with the first network address;

providing second print job data for a second print job;

directing the second print job data over the communications network link to a second network address associated with a second printer default configuration;

interrupting the operation of the printer upon the second print job data being directed to the second network address; setting the printer in accordance with the default configuration associated with the second network address, in response to the direction of second print job data to the second network address; and operating the printer in accordance with the second print job data and the default configuration associated with the second network address.

2. A method as recited in claim 1, wherein said default configuration associated with the first address includes an interrupt parameter for controlling the printer to interrupt the first print job upon the second print job data being directed to the second address.

3. A method as recited in claim 1, further comprising the step of:

continuing the operation of the printer in accordance with the second print job data and the default configuration associated with the second address until completion of the second print job;

restoring the printer setting in accordance with the default configuration associated with the first address upon completion of the second print job.

4. A method as recited in claim 3, further comprising the step of continuing the operation of the printer in accordance with the first print job data and the default configuration associated with the first address until completion of the first print job.

5. A controller for setting a printer default configuration for a printer coupled to first and second user stations through a communications network link, wherein the first user station is adapted to direct print job data to a first network address through the communications network link for a first print operation, and wherein the second user station is adapted to direct print job data to a second network address through the communications network link for a second print operation, the controller comprising:

means for setting the printer in accordance with a first default configuration in response to the direction of print job data to the first Network address;

means for interrupting the first print operation upon the second print job data being directed to the second network address; and means for setting the printer in accordance with a second default configuration in response to the direction of print job data to the second network address.

6. Apparatus for setting a printer default configuration for a printer coupled to a plurality of user stations through a communications network link, wherein each user station is adapted to direct print job data to first and second network addresses through the communications network link, the apparatus comprising:

means for associating the first network address with a first printer default configuration and for associating the second network address with a second printer default configuration; means for setting the printer in accordance with the first default configuration in response to the direction of print job data to the first network address;

means for operating the printer in accordance with the first default configuration and the print job data directed to the first network address upon the printer being set in accordance with the first default configuration;

means for interrupting the operation of the printer upon the second print job data being directed to the second network address;

means for setting the printer in accordance with the second default configuration in response to the direction of print job data to the second network address; and means for operating the printer in accordance with the second default configuration and the print job data directed to the second network address upon the printer being set in accordance with the second default configuration.

7. A printer adapted to be coupled to first and second user stations through a communications network link, wherein the first user station is adapted to direct print job data to a first network address through the communications network link for a first print operation, and wherein the second user station is adapted to direct print job data to a second network address through the communications network link for a second print operation, the printer comprising:

means for setting a first default configuration in response to the direction of print job data to the first network address;

means for interrupting the first print operation upon the second print job data being directed to the second network address; and means for setting a second default configuration in response to the direction of print job data to the second network address.

8. A network comprising:

a communications network link, first and second user stations, the first user station adapted to direct print job data to a first network address through the communications network link for a first print operation, and the second user station adapted to direct print job data to a second network address through the communications network link for a second print operation; and a printer coupled to the communication network link, the printer comprising:
  means for setting a first default configuration in response to the direction of print job data to the first network address;
  means for interrupting the first print operation upon the second print job data being directed to the second network address; and
  means for setting a second default configuration in response to the direction of print job data to the second network address.

* * * * *